L. J. HUNT.
ALTERNATING CURRENT DYNAMO ELECTRIC MACHINE.
APPLICATION FILED DEC. 10, 1915.
1,244,983.
Patented Oct. 30, 1917.
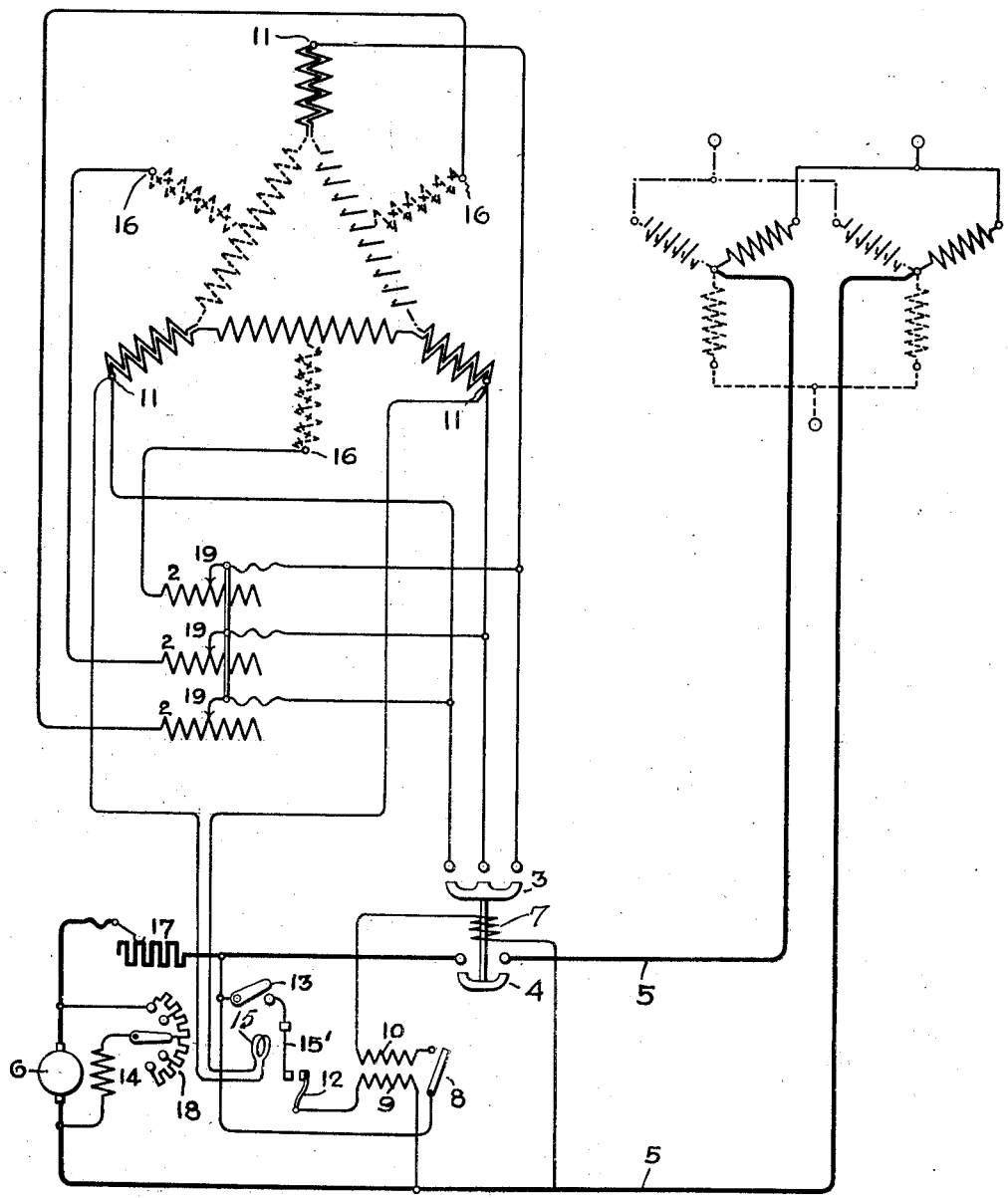
Inventor:
Louis J. Hunt,
by Albert G. Davis
His Attorney

UNITED STATES PATENT OFFICE.

LOUIS J. HUNT, OF SANDYCROFT, WALES, ASSIGNOR TO GENERAL ELECTRIC COMPANY, A CORPORATION OF NEW YORK.

ALTERNATING-CURRENT DYNAMO-ELECTRIC MACHINE.

1,244,983.  Specification of Letters Patent.  Patented Oct. 30, 1917.

Application filed December 10, 1915. Serial No. 66,056.

*To all whom it may concern:*

Be it known that I, LOUIS J. HUNT, a subject of the King of Great Britain, residing at Sandycroft, in the county of Flint, in the Principality of Wales, have invented certain new and useful Improvements in Alternating-Current Dynamo-Electric Machines, of which the following is a specification.

This invention relates to an alternating current motor having armature and field members with windings on each member adapted to give two different basal numbers of poles for cascade working, the windings on the armature member, preferably the rotor, comprising mesh connected windings, a set of windings connected to the points of the mesh and a set of windings connected to the mid points of the mesh. In the British Patent No. 9261 of 1913 is described such a motor, it being arranged to be started while operating practically as an induction motor with one of the basal pole numbers until synchronous speed is attained or passed, whereupon the connections are changed so that the machine will run as a synchronous motor at the cascade speed, while direct-current is supplied to a separate winding on the stator or to tappings on the winding which also serves for the alternating current excitation. Among the advantages mentioned in the said specification occurred the statement that no high voltage would be induced in the direct-current windings on the stator during starting, because the slip-ring resistances need never be open-circuited during starting. It has now been found that with windings as described in the said patent, local circulating currents will flow in the rotor and will produce a second field which can only be suppressed by opening out the neutral points of the rotor windings and connecting them to additional slip-rings.

It has further been discovered that the machine will come into synchronism without three of the slip-rings of the rotor being open-circuited, as under all conditions of load the second element of the machine is really synchronized practically on light load.

The present invention therefore includes a new method of starting such machines, but before it can be explained fully it is desirable to state exactly what happens, as is proved by experiment, when synchronizing is effected with a machine of the type set forth in British Patent No. 9261 of 1913, but having only three slip-rings connected to the rotor winding at the ends of the additional coils thereof.

If the machine has been brought, while working as an induction motor, to a speed above the cascade speed at which synchronous working will ultimately take place, synchronizing is practically instantaneous on closing the switch of the direct-current field-circuit. This is apparently because the alternating currents induced owing to the machine running a little above the synchronous speed, have a braking action quickly pulling back the machine to synchronous speed. The slip-rings carry the load currents, and the local currents circulating in the short-circuited star and the mesh portions of the rotor winding are largely wattless.

On the other hand, if the machine has been brought up to a speed somewhat below the synchronous cascade speed, when the direct-current circuit is closed, alternating currents are induced in the circuits on the stator, and these alternating currents coöperating with the slip-ring currents take part of the load, thus reducing the currents in the starting resistances. As the currents through the slip-rings are reduced, the speed of the machine automatically increases until it attains the synchronous speed.

In both of the above cases, the machine is, after synchronizing, in the condition of an induction motor in cascade with a synchronous motor, the starting resistances forming a local current path for the induction motor circuits. After the synchronizing, the slip-rings can be open-circuited, whereby the local current path is broken and the load currents must flow through the synchronous part of the machine. The transference of the load is gradual, and depends upon the time taken in bringing the starting resistances to the "off" position.

Taking account of the actions which occur in synchronizing as above explained, it is now seen that the switching arrangements may advantageously be modified as compared with what is shown and described in the British Patent No. 9261 of 1913. In Fig.

2 of the said patent, two independent three-phase starters are shown, and it is necessary to open-circuit one of these in order to produce the second field. As the two starters are virtually in series, large fluctuations of current and speed are liable to result unless the resistance of the one starter is increased by the same amounts as the resistance of the other is reduced during the process of open-circuiting the one resistance. This may be avoided by modifying the connections so that resistances are inserted between the pairs of slip-rings connected to diametrically opposite pairs of points in the winding, while also a short-circuiting switch is provided adapted when required to short-circuit three of the slip-rings. This is illustrated in the accompanying drawing, wherein the winding having its terminals connected to slip-rings 11 and 16 respectively may be assumed to correspond with the winding shown in Fig. 2 of the above mentioned British patent. The three slip-rings numbered 11 have connections which are adapted to be short-circuited by a switch 3. The slip-rings 11 are also connected to the contact makers 19 of three resistances 2, which are connected to the respective slip-rings 16 as shown. The resistances 2 take the place of the resistances 13 and 14 in Fig. 2 of the above mentioned British patent. The slip-rings 11 are short-circuited by the switch 3, and then the resistances 2 may be gradually cut out until the slip-rings 16 are open-circuited, when the condition of affairs shown in Fig. 2 of the aforementioned patent will be reached. The contact makers 19 are all moved simultaneously so as to vary the resistances 2 simultaneously, and hence no fluctuations of current and speed are to be expected, because the currents in the diametrically opposite sections of the star portions of the rotor winding are controlled by the same resistance, that is, each of the resistances 2 is connected between the end of one of the windings connected to the mid-points of the mesh and the end of the winding connected to the point of the mesh diametrically opposite. The currents being equal they cannot produce a second field. There is no variation in the rotor resistance when the slip-rings 11, which are to form the neutral point of the winding are short-circuited, this being done when or after the machine has been brought up to the synchronous cascade speed. The closing of the switch 3 will not change the resistance in the rotor circuits because the voltage across each resistance 2, is not altered by the closing of switch 3. When the switch 3 is open the voltage across each pair of slip-rings 11 and 16 connected through the resistances 2 may be represented by V, which is therefore the voltage across each resistance 2. When the switch 3 is closed the rotor winding is connected in star at three terminal points 11, and the voltage across the other three slip-rings 16 rises to $\sqrt{3}V$; but the closing of the switch 3 has also connected the resistances 2 in star through the contact makers 19 between the set of slip-rings 16, so that the voltage across each resistance is still V. Hence, the closing of the short-circuiting switch has not in theory changed the resistances in the rotor circuits. In practice there may be, and generally will be a small difference in voltage owing to the action of the second field, and any reduction in the current through the slip-rings 16 due to this will be taken as a load by the synchronous portion of the machine. The use of six slip-rings 11 and 16 connected as above described, enables the starting current of the machine to be reduced, as no second field exists during starting and the mains are therefore relieved of the magnetizing current which would have been necessary to produce this field.

The actual operation of starting may be varied in three ways, as follows—

I. The excitation switch for the direct-current field and the short-circuiting switch 3 of the rotor winding may be closed simultaneously by the one handle.

II. The excitation switch for the direct-current field may be closed with the main starting switch of the machine, and the short-circuiting switch 3 of the rotor may be closed only when cascade speed is reached.

III. The starting may be effected without the direct-current circuit being closed, and upon reaching cascade speed either the short-circuiting switch may be closed first and the direct-current excitation switch closed afterward, or the direct-current switch may be closed first and the short-circuiting switch afterward.

In either case the resistances 2 can be gradually increased until they can be open-circuited for the normal running at cascade speed, or they can be open-circuited at once.

The first method is the most satisfactory for many purposes, but it may be preferable to increase the direct-current field gradually rather than to switch it on at full strength at once.

Method II has the disadvantage that the full direct-current produces a very strong field, because at starting there are no back ampere-turns on the rotor. The presence of this field therefore saturates the iron and the starting current is largely increased due to the increased iron losses and to the increased magnetizing current required. If Method II is adopted therefore, it is practically necessary to apply only a weak direct-current field at starting and to increase it gradually, as is easily done if a regulator is provided in the direct-current circuit.

If Method III is adopted, the short-circuiting switch 3 can only be closed first if certain types of windings are used on the stator, such for example as the winding indicated in Fig. 3 of the above mentioned British patent, such windings having no closed paths in which local currents produced by the rotor field can circulate; the short-circuiting switch 3 could not be closed first if the stator winding were such that it might carry induced currents even with the direct-current field connections open-circuited.

The operation of changing the connections for synchronous running may be made automatic in various ways. For instance, the short-circuiting switch 3 and the switch which closes the direct-current field circuit, may be arranged to be closed by means of a solenoid controlled by a relay, the said relay in turn being operated by some device which will throw it into action when synchronous speed is attained. Such a device might be a tachometer directly measuring the speed and closing a relay circuit on attainment of the required cascade speed; again, it might be a voltmeter connected to the slip-rings and arranged to close a contact in the relay circuit when the slip-ring voltage corresponds with that for the cascade speed; finally, a frequency meter 15 might be used connected to the slip-rings, and arranged to close the relay circuit when the rotor frequency corresponds to that for cascade speed. This latter arrangement is illustrated in the drawing and it has the advantage at any rate over the voltmeter arrangement, that it will always operate at the proper speed whereas the slip-ring voltage will vary somewhat according to the load against which the motor is starting, so that the voltmeter would cause the closing of the short-circuiting switch at somewhat different speeds according to the load. In the drawing 15' is the reed of the frequency meter 15 constructed in any known way, the reed being of such a length and form as to vibrate strongly when the required frequency is attained, when it will come against a spring contact 12. This is in a local circuit supplied with current from the generator 6 which is intended to supply the direct-current for the stator field, which I have shown as being of the type shown in my U. S. Patent No. 1,203,347, dated Oct. 31, 1916. The local circuit includes a switch 13 which will preferably be a push-button which requires to be held down during starting until synchronous working is attained, after which the switch 13 is released breaking the local circuit. The generator 6 has a shunt-field 14 controlled by a regulator 18, while it also has a series regulator 17. The direct-current field of the stator is supplied through the leads 5, the circuit being closed by a switch 4 which operates simultaneously with the short-circuiting switch 3. Both switches 3 and 4 are operated by means of a solenoid, the coil 7 of which is in a local circuit adapted to be closed by a switch 8 when it is drawn up by a coil 9 in the local circuit including the vibrating reed 15. When the switch 8 is closed, its circuit includes another coil 10 which acts as a holding coil to maintain the switch 8 closed so long as the direct-current is being supplied to the field winding through the leads 5.

It will be understood that the invention is applicable to machines having any convenient numbers of poles as set out in the specification of my prior U. S. Patent Reissue No. 13,591, dated July 8, 1913, and if the windings are repeated on the rotor so that there are two or more similar sets of terminals, corresponding terminals may be connected to the same slip-ring 11 or 16 and the action will be the same as above set forth, or they may be connected in groups in series.

It will be evident that the functions of the stator and the rotor may be reversed, the excitation current being supplied to the rotor, while the stator then carries the windings hereinbefore referred to as being on the rotor. This will make no difference in principle.

I desire it to be understood, that I aim in the appended claims to cover such and other modifications which do not depart from the spirit and scope of my invention.

What I claim as new and desire to secure by Letters Patent of the United States, is:—

1. An alternating current motor having armature and field members, windings on each member adapted to give two different basal numbers of poles for cascade working, the windings on one member comprising mesh-connected windings, a set of windings connected to the points of the mesh and a set of windings connected to the mid points of the mesh, a plurality of resistances, each of said resistances being connected between the end of one of said windings connected to the mid points of the mesh and the end of the winding connected to the point of the mesh diametrically opposite, means for short circuiting one of said sets of windings, and means for varying said resistances so as to increase the amount thereof connected between the ends of said windings.

2. An alternating current motor having armature and field members, windings on each member adapted to give two different basal numbers of poles for cascade working, the windings on one member comprising mesh-connected windings, a set of windings connected to the points of the mesh and a set of windings connected to the mid points of the mesh, a plurality of resistances, each of said resistances being connected between the end of one of said windings connected to the mid points of the mesh and the end of the winding connected to the point of the mesh diametrically opposite, means for short circuiting one of said sets of windings, and means for simultaneously varying said resistances so as to increase the amount thereof connected between the ends of said windings.

3. An alternating current motor having armature and field members, windings on each member adapted to give two different basal numbers of poles for cascade working, the windings on one member comprising mesh-connected windings, a set of windings connected to the points of the mesh and a set of windings connected to the mid points of the mesh, a plurality of resistances, each of said resistances being connected between the end of one of said windings connected to the mid points of the mesh and the end of the winding connected to the point of the mesh diametrically opposite, automatic means dependent upon the speed of said motor for short circuiting one of said sets of windings, and means for simultaneously varying said resistances so as to increase the amount thereof connected between the ends of said windings.

4. An alternating current motor having armature and field members, windings on each member adapted to give two different basal numbers of poles for cascade working, the windings on one member comprising mesh-connected windings, a set of windings connected to the points of the mesh and a set of windings connected to the mid points of the mesh, a plurality of resistances, each of said resistances being connected between the end of one of said windings connected to the mid points of the mesh and the end of the winding connected to the point of the mesh diametrically opposite, automatic means dependent upon the frequency of the voltage in one of said sets of windings for short circuiting one of said sets of windings, and means for simultaneously varying said resistances so as to increase the amount thereof connected between the ends of said windings.

5. An alternating current motor having armature and field members, windings on each member adapted to give two different basal numbers of poles for cascade working, a source of direct current supply for the windings on said field member, the windings on the armature member comprising mesh connected windings, a set of windings connected to the points of the mesh and a set of windings connected to the mid points of the mesh, a plurality of resistances, each of said resistances being connected between the end of one of said windings connected to the mid points of the mesh and the end of the winding connected to the point of the mesh diametrically opposite, automatic means dependent upon the speed of said motor for short-circuiting one of said sets of windings and for connecting said source of direct current supply to the windings on said field member, and means for simultaneously varying said resistances so as to increase the amount thereof connected between the ends of said windings.

6. An alternating current motor having armature and field members, windings of each member adapted to give two different basal numbers of poles for cascade working, a source of direct current supply for the windings on said field member, the windings on the armature member comprising mesh connected windings, a set of windings connected to the points of the mesh and a set of windings connected to the mid points of the mesh, a plurality or resistances, each of said resistances being connected between the end of one of said windings connected to the mid points of the mesh and the end of the winding connected to the point of the mesh diametrically opposite, automatic means dependent upon the frequency of the voltage in one of said sets of windings for short-circuiting one of said sets of windings and for connecting said source of direct current supply to the windings on said field member, and means for simultaneously varying said resistances so as to increase the amount thereof connected between the ends of said windings.

7. The method of starting an alternating current motor having armature and field members with windings on each member adapted to give two different basal numbers of poles for cascade working, the windings on one member comprising mesh connected windings, a set of windings connected to the points of the mesh, a set of windings connected to the mid points of the mesh, and a plurality of resistances, each of which being connected between the end of one of said windings connected to the mid points of the mesh and the end of the winding connected to the point of the mesh diametrically opposite, which consists in short-circuiting one of said sets of windings and thereby leaving the other of said sets connected in star through said resistances, and then simultaneously varying said resistances so as to gradually increase the amount thereof connected between the ends of said set of windings connected in star through said resistances.

8. The method of starting an alternating current motor having armature and field members with windings on each member adapted to give two different basal numbers of poles for cascade working, the windings on said armature member comprising mesh connected windings, a set of windings connected to the points of the mesh, a set of windings connected to the mid points of the mesh, and a plurality of resistances, each of which being connected between the end of one of said windings connected to the mid points of the mesh and the end of the winding connected to the point of the mesh diametrically opposite, which consists in short-circuiting one of said sets of windings and thereby leaving the other of said sets connected in star through said resistances, connecting a source of direct current supply to the windings on the field member, and then simultaneously varying said resistances so as to gradually increase the amount thereof connected between the ends of said set of windings connected in star through said resistances.

In witness whereof, I have hereunto set my hand this 24th day of November, 1915.

LOUIS J. HUNT.

---

Correction in Letters Patent No. 1,244,983.

It is hereby certified that in Letters Patent No. 1,244,983, granted October 30, 1917, upon the application of Louis J. Hunt, of Sandycroft, Wales, for an improvement in "Alternating-Current Dynamo-Electric Machines," an error appears in the printed specification requiring correction as follows: Page 4, line 83, claim 6, for the word "or" read *of;* and that the said Letters Patent should be read with this correction therein that the same may conform to the record of the case in the Patent Office.

Signed and sealed this 29th day of January, A. D., 1918.

[SEAL.]

R. F. WHITEHEAD,

*Acting Commissioner of Patents.*

Cl. 172—274.